J. A. HEIDBRINK.
MOUTH PROP.
APPLICATION FILED MAR. 22, 1920.

1,415,347.

Patented May 9, 1922.

INVENTOR:
JAY A. HEIDBRINK.
BY Whiteley and Ruckman
ATTORNEYS.

UNITED STATES PATENT OFFICE.

JAY A. HEIDBRINK, OF MINNEAPOLIS, MINNESOTA.

MOUTH PROP.

1,415,347.  Specification of Letters Patent.  Patented May 9, 1922.

Application filed March 22, 1920. Serial No. 367,901.

*To all whom it may concern:*

Be it known that I, JAY A. HEIDBRINK, a citizen of the United States, residing at Minneapolis, in the county of Hennepin and State of Minnesota, have invented certain new and useful Improvements in Mouth Props, of which the following is a specification.

My invention relates to mouth props and has for its object the provision of a device which may be readily manufactured and which will be convenient for use in holding open the mouth of a patient when the occasion for so doing arises, as in the performance of oral operations.

The full objects and advantages of my invention will appear in connection with the detailed description thereof, and the novel features embodied in my inventive idea will be particularly pointed out in the claims.

Referring to the accompanying drawings, which illustrate the application of my invention in one form,—

Figure 1:
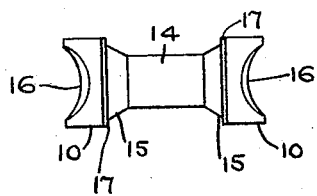
Figure 2:
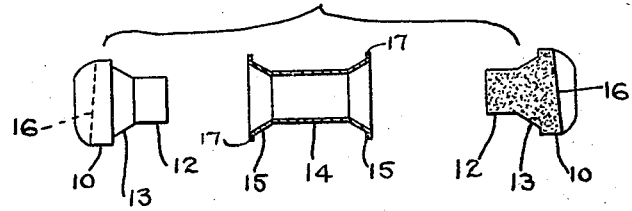
Figure 3:
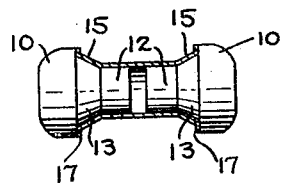

Fig. 1 is a view in side elevation. Fig. 2 is a view of the three members of my device unassembled, two of them being in section and one of them in side elevation. Fig. 3 is a view showing the sleeve in longitudinal central section and the end members in elevation.

Referring to the particular construction shown in the drawings, I provide two similar end members which are formed of material which is slightly resilient, such as hard rubber. Each of these end members consists of a head 10 and a shank portion 12 of reduced size which are joined by an inclined portion 13. In order to hold the end members together in proper position I employ a sleeve 14 which is preferably of metal into which the shanks 12 of the two end members are adapted to be inserted with a frictional fit, the inclined portion 13 fitting into flared end portions 15 on the sleeve. The length of the sleeve is such that the heads 10 are spaced apart the proper distance to fit between the upper and lower teeth and thus hold the mouth of the patient in open position. The outer faces of the heads are preferably provided with concave or hollowed-out recesses 16 which are inclined or beveled from one end of the recess toward the other. When the device is assembled these recesses are similarly arranged with the inclines extending in the same direction as shown in Fig. 1. On account of this construction and arrangement a firm grip is obtained. The end members are frictionally held within the sleeve and hence may be removed when desired and replaced by new end members. The ends of the flared portions of the sleeve 14 are preferably provided with circumferential flanges 17 upon which the inner margins of the heads 10 fit when the latter are in place on the sleeve.

I claim:

1. A mouth prop comprising two end members, shank portions integral with said end members, and a sleeve within which said shank portions are held.

2. A mouth prop comprising two end members of hard rubber, shank portions integral with said end members, and a metallic sleeve holding said shank portions.

3. A mouth prop comprising two end members having head portions and shank portions joined by an inclined portion, and a sleeve within which said shank portions are held, the ends of said sleeve being flared to receive said inclined portions.

4. A mouth prop comprising two end members, the outer faces of which are provided with concave inclined recesses, shank portions on said end members, and a sleeve within which said shank portions are frictionally held.

5. A mouth prop comprising two end members having head portions and shank portions joined by an inclined portion, and a sleeve within which said shank portions are held, the ends of said sleeve being flared to receive said inclined portions and being also provided with circumferential flanges upon which the inner margins of said head portions fit.

In testimony whereof I hereunto affix my signature.

JAY A. HEIDBRINK.